United States Patent
Maeda et al.

(10) Patent No.: US 8,744,833 B2
(45) Date of Patent: Jun. 3, 2014

(54) METHOD AND APPARATUS FOR CREATING A LANGUAGE MODEL AND KANA-KANJI CONVERSION

(75) Inventors: Rie Maeda, Tokyo (JP); Yoshiharu Sato, Yokohama (JP); Miyuki Seki, Tokyo (JP)

(73) Assignee: Microsoft Corporation, Redmond, WA (US)

( * ) Notice: Subject to any disclaimer, the term of this patent is extended or adjusted under 35 U.S.C. 154(b) by 1569 days.

(21) Appl. No.: 11/917,657

(22) PCT Filed: Jun. 23, 2006

(86) PCT No.: PCT/US2006/024566
§ 371 (c)(1),
(2), (4) Date: Jun. 4, 2009

(87) PCT Pub. No.: WO2007/002456
PCT Pub. Date: Jan. 4, 2007

(65) Prior Publication Data
US 2011/0106523 A1 May 5, 2011

(30) Foreign Application Priority Data
Jun. 24, 2005 (JP) .................................. 2005-185765

(51) Int. Cl.
*G06F 17/20* (2006.01)
(52) U.S. Cl.
USPC ....................................... 704/1; 704/2; 704/4
(58) Field of Classification Search
USPC ..................................................... 704/1, 2, 4
See application file for complete search history.

(56) References Cited

U.S. PATENT DOCUMENTS

| 5,029,084 | A | * | 7/1991 | Morohasi et al. | 704/9 |
| 5,079,701 | A | * | 1/1992 | Kuga et al. | 704/10 |
| 5,745,881 | A | * | 4/1998 | Tada et al. | 704/7 |
| 5,835,893 | A | | 11/1998 | Ushioda | |
| 5,943,443 | A | | 8/1999 | Itonori et al. | |
| 6,356,866 | B1 | | 3/2002 | Pratley et al. | |

(Continued)

FOREIGN PATENT DOCUMENTS

JP  11-328179  11/1999

OTHER PUBLICATIONS

Gao, "Exploiting Headword Dependency and Predictive Clustering for Language Modeling", Proceedings of the Conference on Empirical Methods in Natural Language Processing (EMNLP), 2002.*
Niesler et al. "Comparison of Part-of-Speech and Automatically Derived Category-Biased Language Models for Speech Recognition", ICASSP, 1998.*
Miller et al. "Evaluation of a Language Model using a Clustered Model Backoff", ICSLP, 1996.*

(Continued)

*Primary Examiner* — Jialong He
(74) *Attorney, Agent, or Firm* — Steve Crocker; Jim Ross; Micky Minhas

(57) ABSTRACT

Method for creating a language model capable of preventing deterioration of quality caused by the conventional back-off to unigram. Parts-of-speech with the same display and reading are obtained from a storage device (206). A cluster (204) is created by combining the obtained parts-of-speech. The created cluster (204) is stored in the storage device (206). In addition, when an instruction (214) for dividing the cluster is inputted, the cluster stored in the storage device (206) is divided (210) in accordance with to the inputted instruction (212). Two of the clusters stored in the storage device are combined (218), and a probability of occurrence of the combined clusters in the text corpus is calculated (222). The combined cluster is associated with the bigram indicating the calculated probability and stored into the storage device.

20 Claims, 9 Drawing Sheets

(56) References Cited

U.S. PATENT DOCUMENTS

| | | | |
|---|---|---|---|
| 6,490,563 B2 * | 12/2002 | Hon et al. | 704/260 |
| 6,654,744 B2 | 11/2003 | Katayama et al. | |
| 7,275,029 B1 * | 9/2007 | Gao et al. | 704/9 |
| 2001/0044724 A1 * | 11/2001 | Hon et al. | 704/260 |
| 2003/0055655 A1 | 3/2003 | Suominen | |
| 2003/0212563 A1 * | 11/2003 | Ju et al. | 704/277 |
| 2005/0080626 A1 * | 4/2005 | Marumoto et al. | 704/269 |
| 2006/0015326 A1 * | 1/2006 | Mori et al. | 704/9 |
| 2006/0053015 A1 * | 3/2006 | Lai et al. | 704/257 |

OTHER PUBLICATIONS

Gao et al. "Capturing Long Distance Dependency in Language Modeling: An Empirical Study", IJCNLP 2004.*

Japanese Notice of Rejection (Japanese version) in JP Appln No. 2005-185765 dated Sep. 10, 2010, 3 pages.

Japanese Notice of Rejection (English translation) in JP Appln No. 2005-185765 dated Sep. 10, 2010, 3 pages.

Yumba, Hideki; "Oracle Database School"—DB Magazine, Shoeisha, Co., Ltd. vol. 14, No. 4, dated Jul. 1, 2004, with English translated summary page, cover page, plus pp. 134-139.

* cited by examiner

| DISPLAY | READING | PART-OF-SPEECH |
|---------|---------|----------------|
| 秋田 | AKITA | PLACE NAME |
| 秋田 | AKITA | PERSONAL NAME |
| 蔵王 | ZAOU | PLACE NAME |
| . | . | . |

DICTIONARY

FIG. 3

| DISPLAY | READING | EXPANDED PART-OF-SPEECH |
|---------|---------|-------------------------|
| 秋田 | AKITA | PLACE NAME OR PERSONAL NAME |
| 蔵王 | ZAOU | PLACE NAME |
| ⋮ | ⋮ | |

METHOD AND APPARATUS FOR CREATING A LANGUAGE MODEL AND KANA-KANJI CONVERSION

FIELD OF THE INVENTION

The present invention relates to a method for creating a language model, a kana-kanji conversion method and an apparatus therefor, and more particularly to a method for creating a language model, a kana-kanji conversion method, an apparatus therefor and a computer-readable storage medium for creating clusters defined by text superficial information.

DESCRIPTION OF THE RELATED ART

Legacy kana-kanji conversion system is known as a system that uses a part-of-speech table. The part-of-speech table indicates a probability of occurrence of a part-of-speech B following a part-of-speech A. In other words, the part-of-speech table basically indicates bigrams of groups of parts-of-speech and words. Hereinafter, such a group of parts-of-speech and words is called as cluster bigram. Note that the part-of-speech is an abstraction of word behaviors in terms of word grouping by mixture of morphology (word form), grammatical functions (subject or adverb, etc) and semantic information (proper noun or noun).

On the other hand, a trigram language model developed in the field of speech recognition is attempted to apply to the kana-kanji conversion system, and such system has been implemented in part. The trigram language model uses a probability of occurrence of a word that follows preceding certain two words (trigram). For example, a probability p of occurrence of a word w3 following two words w1 and w2 is represented as p(w3|w1 w2).

The trigram captures linguistic phenomena on word level rather than on word group level. Therefore, it is more effective to capture phenomena. Note that the trigram language model captures behaviors of words in human language by using only superficial information rather than any deep semantic or grammatical abstraction.

Language model technology ensures a higher accuracy than legacy technology because of its analysis level.

However, it has a drawback as described below. The traditional language model engine uses back-off to a unigram when the trigram or the bigram does not have sufficiently reliable probability. That is, if p(w3|w1 w2) is not reliable, it resorts to the bigram p(w3|w2). Then, if p(w3|w2) is not reliable, it resorts to the unigram p(w3). For example, if the back-off to the unigram is performed because the trigram and bigram are zero, the probability p of the occurrence of w2 is written as follows:

$$\begin{aligned} P(w3) &= p(w3 \mid w1w2) \\ &= p(w3 \mid w2) \quad \text{if } p(w3 \mid w1w2) \text{ is too small to rely on.} \\ &= p(w3) \quad \text{if } p(w3 \mid w2) \text{ is too small to rely on.} \end{aligned}$$

However, the conventional back-off to the unigram can invite serious errors, because the unigram represents only the occurrence of one word and it does not take any kind of contextual information into account.

On the other hand, the legacy kana-kanji conversion system uses the cluster bigram of parts-of-speech as described above. It always uses contextual information (i.e., the part-of-speech of the preceding word or that of the following word).

Therefore, the traditional language model engine is degraded in some worst situations from the legacy kana-kanji conversion engine using contextual information. This is a contributing factor in deterring users from upgrading the legacy system to the trigram kana-kanji conversion system.

On the other hand, there is another drawback in the conventional grouping of words using the part-of-speech. The exact part-of-speech may require semantic knowledge of human beings. For example, the word "Akita" may be a place-name or a personal-name, but only the human can decide which it is.

As such, the traditional word grouping using the part-of-speech in the legacy kana-kanji conversion system is not oriented to statistical calculation.

SUMMARY OF THE INVENTION

The present invention provides the method for creating the language model, the kana-kanji conversion method, the apparatus therefor and the computer-readable storage medium which can prevent deterioration in quality caused by the back-off to the unigram.

The present invention also provides the method for creating the language model, the kana-kanji conversion method, the apparatus therefor and the computer-readable storage medium which groups of words using part-of-speech adapted for statistical calculation.

According to one aspect of the present invention, there is provided a method for creating a language model using a computer having words in association with display, reading and parts-of-speech in a storage device, the method performed by a processing unit of the computer comprising the steps of: obtaining parts-of-speech with the same display and reading from the storage device; creating a cluster by combining the obtained parts-of-speech; and storing the created cluster into the storage device.

The method may further comprise the steps of: inputting an instruction for dividing the cluster; and dividing the cluster stored in the storage device in accordance with the inputted instruction.

The method may further comprise the steps of: inputting a character string; obtaining a text corpus by assigning parts-of-speech to each word included in the inputted character string; combining two of clusters stored in the storage device; calculating a probability of occurrence of the combined cluster in the text corpus; and associating the combined cluster with cluster bigram indicating the calculated probability and storing the combined cluster with the cluster bigram into the storage device.

According to another aspect of the present invention, there is provided a kana-kanji conversion method by a computer having Ngram indicating a probability of occurrence of a combination of N words, and a cluster bigram indicating a probability of occurrence of a combination of two clusters of parts-of-speech, at least one of the clusters including at least two parts-of-speech, the method comprising the steps of: inputting reading of a character string; dividing the inputted reading; converting the divided reading into kana or kanji to generate a candidate for a converted character string; obtaining Ngram indicating a probability of occurrence of a combination of N words included in the candidate for the converted character string; obtaining a cluster bigram indicating a probability of occurrence of a combination of two clusters included in the candidate for the converted character string;

and determining an order of precedence of candidates for the converted character string in accordance with the obtained Ngram and cluster bigram.

According to another aspect of the present invention, there is provided an apparatus for creating a language model, comprising: storage means for storing information on words in association with display, reading and parts-of-speech; word obtaining means for obtaining parts-of-speech with the same display and reading from the storage means; cluster creating means for creating a cluster by combining the obtained parts-of-speech, and cluster storage controlling means for storing the created cluster into the storage means.

According to another aspect of the present invention, there is provided a kana-kanji conversion apparatus, comprising: storage means for storing Ngram indicating a probability of occurrence of a combination of N words, and a cluster bigram indicating a probability of occurrence of a combination of two clusters of part-of-speech, at least one of the clusters including at least two parts-of-speech; reading inputting means for inputting reading of a character string; reading dividing means for dividing the inputted reading; candidate generating means for converting the divided reading into kana or kanji to generate a candidate for a converted character string; Ngram obtaining means for obtaining Ngram indicating a probability of occurrence of a combination of N words included in the candidate for the converted character string; cluster bigram obtaining means for obtaining a cluster bigram indicating a probability of occurrence of a combination of two clusters included in the candidate for the converted character string; and determining means for determining an order of precedence of candidates for the converted character string in accordance with the obtained Ngram and cluster bigram.

According to another aspect of the present invention, there is provided a computer-readable storage medium having computer-executable instructions stored thereon, wherein the computer-executable instructions make a computer perform the method described above.

The present invention provides a new clustering scheme which is based on the part-of-speech but merges such semantic/grammatical distinctions that were hard to capture by a machine. The clusters are constructed only by text superficial attributes that can be discriminated and processed by the machine. The present invention replaces the back-off to the unigram by the new cluster bigram. Because the final resort at worst is the cluster bigram, it can take word context into account.

By making use of the optimum cluster based on the part-of-speech as last resort means of the trigram language model, the present invention can provide higher quality.

In addition, a language modeling technology of the present invention ensures a higher accuracy than the legacy technology, because it makes clusters of parts-of-speech that can be statistically processed by a computer.

The above and other objects, effects, features and advantages of the present invention will become more apparent from the following description of embodiments thereof taken in conjunction with the accompanying drawings.

BRIEF DESCRIPTION OF THE DRAWINGS

FIG. 3 conceptually illustrates information in a dictionary;

FIG. 5 illustrates an example of clusters given to the dictionary;

DESCRIPTION OF THE PREFERRED EMBODIMENTS

Now, preferred embodiments of the present invention will be described in detail below, with reference to the drawings.

According to one embodiment of the present invention, although a method described herein can be implemented on a single standalone computer system, typically, it can also be implemented on multiple computer systems interconnected to form a distributed computer network.

Figure 1:
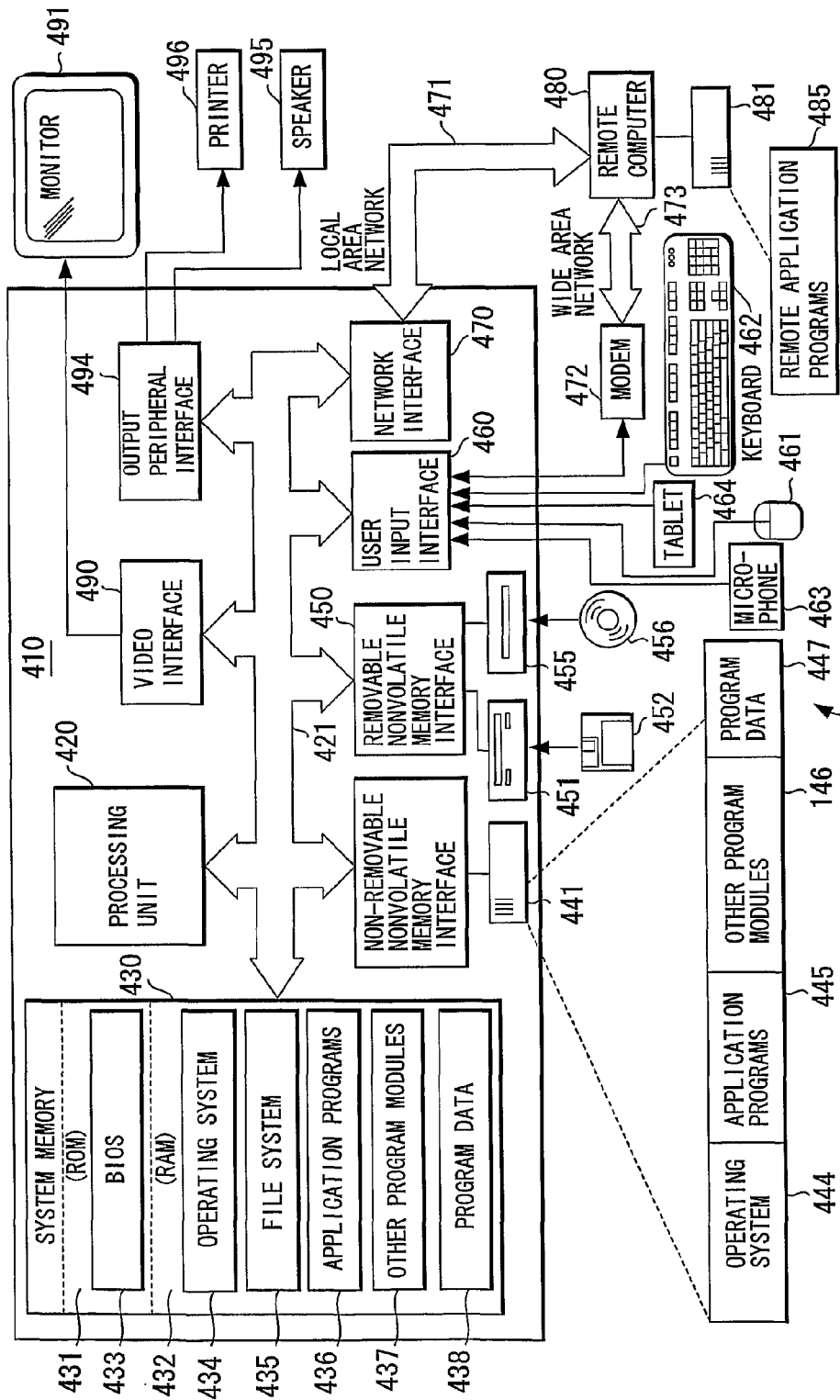
FIG. 1 illustrates a block diagram of an exemplary environment to implement the present invention.

An environment 400 to implement the present invention is shown in FIG. 1. The environment 400 has a computer system 410 that is considered as a main computer system. As used herein, the term "computer system" is broadly interpreted, and defined as "one or more devices or machines to execute a program for displaying and operating texts, graphics, symbols, audio, video and/or numbers".

The invention is operable with numerous other general purpose or special purpose computing system environments or configurations. Examples of well known computing systems, environments, and/or configurations that may be suitable for use with the invention include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 410. Components of the computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Accelerated Graphics Port (AGP) bus, and Peripheral Component Interconnect (PCI) bus also known as Mezzanine bus.

The computer 410 typically includes a variety of computer-readable media. Computer-readable media can be any available media that can be accessed by the computer 410 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 410. Communication media typically embodies computer-readable instructions, data structures, program modules or other data in a modulated data signal such as a carrier wave or other transport mechanism and includes any information delivery media. The term modulated data signal means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 430 includes computer storage media in the form of volatile and/or nonvolatile memory such as read only memory (RAM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 1 illustrates operating system 434, file system 435, application programs 436, other program modules 437 and program data 438.

The computer 410 may also include other removable/non-removable, volatile/nonvolatile computer storage media. By way of example only, FIG. 1 illustrates a hard disc drive 441 that reads from or writes to nod-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media, discussed above and illustrated in FIG. 1, provide storage of computer-readable instructions, data structures, program modules and other data for the computer 410. In FIG. 1, for example, hard disk drive 441 is illustrated as storing operating system 444, application programs 445, other program modules 146 and program data 447. Note that these components can either be the same as or different from operating system 434, application programs 436, other program modules 437, and program data 438. Operating system 444, application programs 445, other program modules 146. and program data 447 are given different numbers herein to illustrate that, at a minimum, they are different copies. A user may enter commands and information into the computer 410 through input devices such as a tablet (electronic digitizer) 464, a microphone 463, a keyboard 462 and pointing device 461, commonly referred to as mouse, trackball or touch pad. Other input devices (not shown) may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. The monitor 491 may also be integrated with a touch-screen panel or the like that can input digitized input such as handwriting into the computer system 410 via an interface, such as a touch-screen interface. Note that the monitor and/or touch screen panel can be physically coupled to a housing in which the computing device 410 is incorporated, such as in a tablet-type personal computer, wherein the touch screen panel essentially serves as the tablet 464. In addition, computers such as the computing device 410 may also include other peripheral output devices such as speakers 495 and printer 496, which may be connected through an output peripheral interface 494 or the like.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 1. The logical connections depicted in FIG. 1 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460 or other appropriate mechanism. In a networked environment, program modules depicted relative to the computer 410, or portions thereof, may be stored in the remote memory storage device. By way of example, and not limitation, FIG. 1 illustrates remote application programs 485 as residing on memory device 481.

It will be appreciated that the network connections shown are exemplary and other means of establishing a communications link between the computers may be used.

Embodiments of the present invention are described with respect to logical operation performed in order to implement processes for embodying the embodiments with this computer environment in mind.

Figure 2:
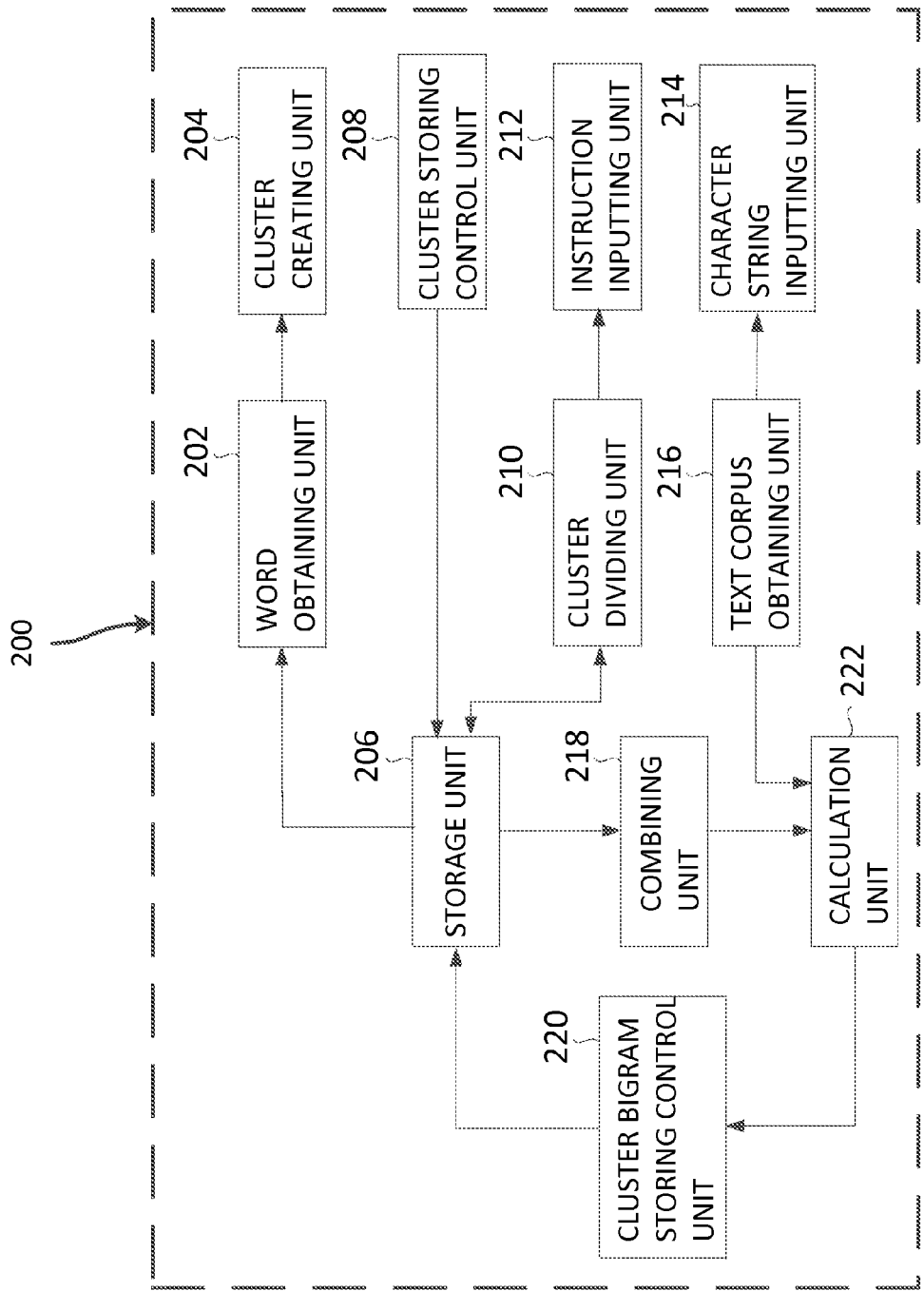
FIG. 2 illustrates a schematic block diagram of a functional configuration of an apparatus for creating a language model according to one embodiment of the present invention.

FIG. 2 illustrates the schematic block diagram showing the functional configuration of the language model creating apparatus according to the embodiment of the present invention.

The language model creating apparatus 200 includes at least a word obtaining unit 202, a cluster creating unit 204, a storage unit 206, a cluster storing control unit 208, a cluster dividing unit 210, an instruction inputting unit 212, a character string inputting unit 214, a text corpus obtaining unit 216, a combining unit 218, a cluster bigram storing control unit 220 and a calculation unit 222.

The storage unit 206 is configured with the hard disk drive 441, the nonvolatile magnetic disk 452, the nonvolatile optical disk 456 and the like, and stores at least dictionary data. The dictionary includes word information that associates the display (orthography), reading (phonetic notation) and a part-of-speech.

Functions of the other components of the language model creating apparatus 200 are implemented by the processing unit 420 which executes instructions of a program stored in the system memory 430 or controls the hardware components described with reference to FIG. 1.

The word obtaining 202 obtains the part-of-speech of words having the same display and reading.

The cluster creating unit 204 creates the cluster by combining parts-of-speech of words obtained by the word obtaining unit 202.

The cluster storing control unit 208 stores the clusters created by the cluster creating unit 204 into the storage unit 206.

The instruction inputting unit 212 is configured with the mouse 461, the tablet 464, the keyboard 462, the user input interface 460 and the like and inputs an instruction to divide the cluster in accordance with parts-of-speech.

The cluster dividing unit 210 divides the cluster stored in the storage unit 206 in accordance with the instruction inputted by the instruction inputting unit 212.

The character string inputting unit 214 is configured with the non-removable nonvolatile memory interface 440, removable nonvolatile memory interface 450 and the like, and inputs character string data (e.g., character strings included in an article of newspaper) stored in the hard disk drive 441, the nonvolatile magnetic disk 452, and the nonvolatile optical disk 456 and the like.

The text corpus obtaining unit 216 obtains the text corpus by giving the reading and the part-of-speech to each word included in the character string inputted by the character string inputting unit 214.

The combining unit 218 combines two of the clusters stored in the storage unit 206.

The calculation unit 222 calculates the probability of occurrence of the cluster combined by the combining unit 218.

The cluster bigram storing control unit 220 associates the cluster combined by the combining unit 218 with the cluster bigram indicating the probability calculated by the calculation unit 222.

FIG. 3 conceptually illustrates information in the dictionary in the storage unit 206. The dictionary includes displays (秋田, 蔵王), readings (akita, zaou) and parts-of-speech (place-name and personal name). More particularly, the part-of-speech is associated with the display and the reading. As shown in this figure, a combination of the display (秋田) and the reading (akita) are associated with two parts-of-speech.

Figure 4:
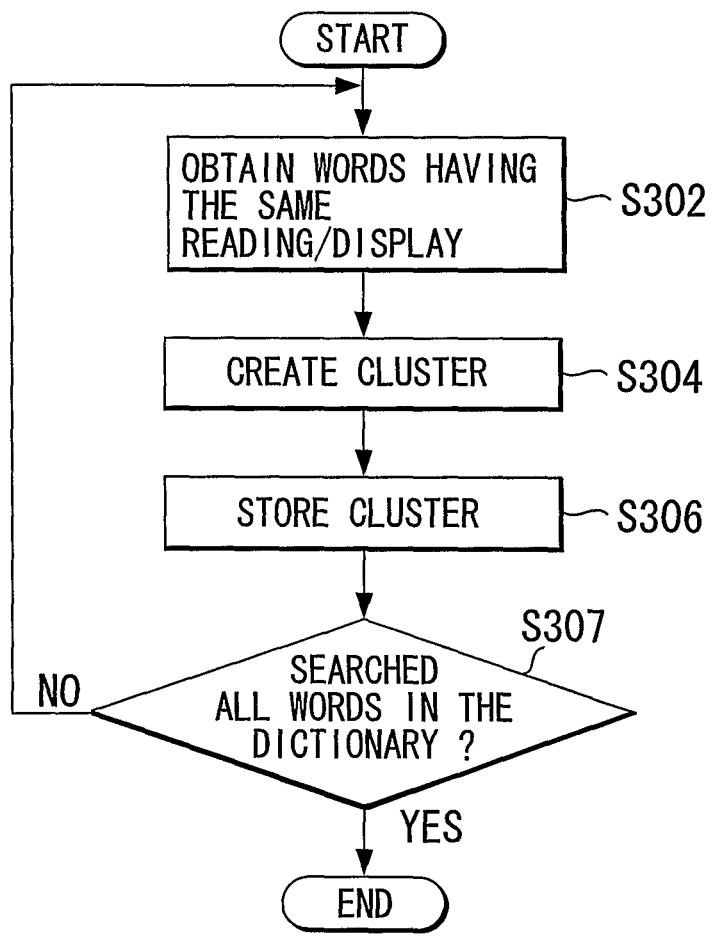
FIG. 4 illustrates a flow diagram showing a procedure for creating the language model according to the present invention.

FIG. 4 illustrates the flow diagram showing the procedure for creating the language model according to the embodiment of the present invention performed by the language model creating device 200.

In Step S302, the word obtaining unit 202 obtains pars-of-speech of words having the same display and reading from the storage unit 206. In the example shown in FIG. 3, information on parts-of-speech of words having the display (秋田) and reading (akita) can be obtained. In step S304, the cluster creating unit 204 creates clusters by combining parts-of-speech of the obtained word with OR operator. In an example shown in FIG. 5, the cluster of the expanded part-of-speech "personal name OR place-name" is created. A new ID is assigned to the created cluster.

The cluster created as described above is associated with information on each word stored in the dictionary. For example, The cluster "personal name OR place-name" is assigned to the word having the display "秋田" and the reading "akita".

In Step S306, the cluster storing control unit 208 stores the created cluster.

The above procedure repeats until research is completed for information on all words in the dictionary.

Figure 6:
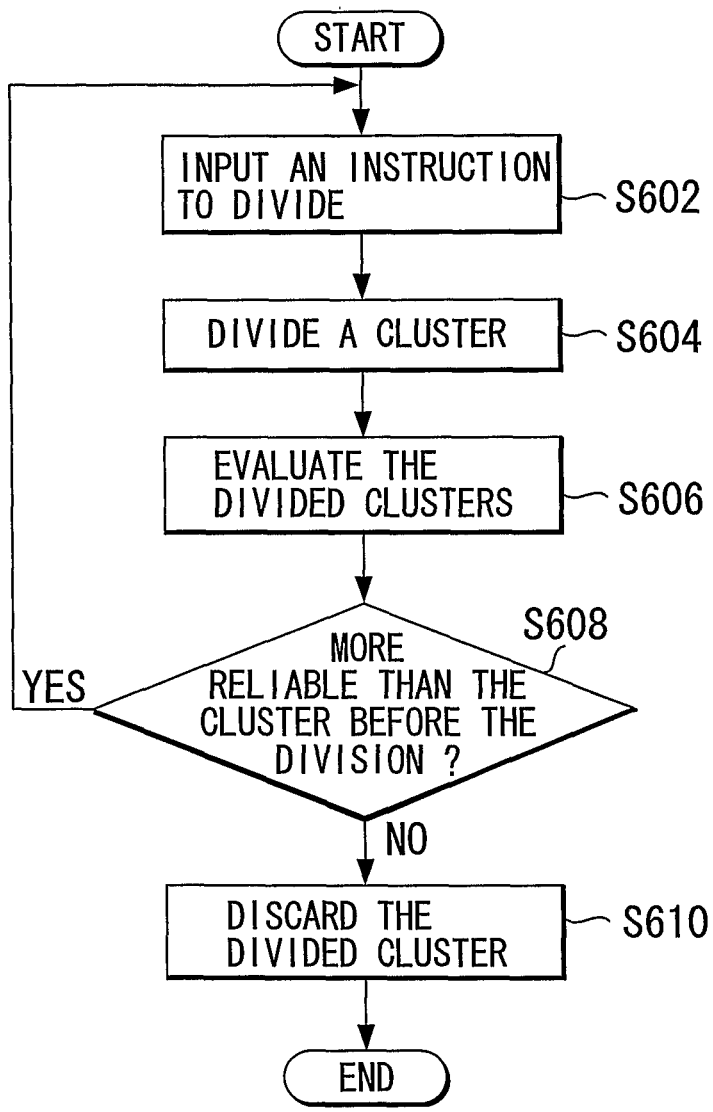
FIG. 6 illustrates a flow diagram showing an example of a procedure to divide the cluster into a computer-processable level by a computer.

FIG. 6 illustrates the flow diagram of one example of the procedure for dividing the cluster created by the above process so that the computer can use it to perform statistical work in the language model creating apparatus 200. This process can be executed for all of clusters created by the process shown in FIG. 4.

Assume that the cluster of interest is "part-of-speech A OR part-of-speech B". The cluster is split into two separate clusters A and B, as long as occurrence of A and that of B can be identified mechanically with superficial phenomena on the training corpus.

For example, the part-of-speech of the word " "ああ (aa)" can be thought as an interjection or an adverb followed by a verb having irregular conjugation in the S series. When this word occurs in the corpus and a word having irregular conjugation in the S series follows the word "ああ", such as "ああすればよかったのに ("aa sureba yokattanoni"), it can be determined that the part-of-speech of this word is the irregular conjugation in the S series. In this case, a cluster "interjection or adverb followed by a verb having irregular conjugation in the S series" can be divided into "interjection" and "adverb followed by a verb having irregular conjugation in the S series".

On the other hand, it is impossible to determine whether the part-of-speech of the word having the display "秋田" and the reading "あきた" is the personal name or the place-name. Accordingly, it is determined that the part-of-speech of this word belongs to the expanded part-of-speech "person name or place-name".

Actually, the division is performed by calculating an effect. The language model is created by assumptive division to evaluate the, effect using a character error rate. If we obtain an error reduction, then the split is adopted. For example, assume that the cluster is created by merging possible parts-of-speech of the word "あ あ" and upon evaluation, its error rate is 3%. Also, assume that the cluster is divided into two clusters and upon evaluation, its error rate is 2%. In this case, the latter which is smaller will be adopted.

In Step S602, the instruction inputting unit 212 receives instruction to divide the cluster in accordance with the part-of-speech.

The cluster is the information on the part-of-speech combined with one or more OR operators. Here, the instruction specifies how to divide a number of parts-of-speech into groups.

In Step S604, the language model creating apparatus 200 maintains the cluster in a buffer (not shown) before division, and divides the cluster stored in the storage unit 206 in accordance with the inputted instruction.

New ID is assigned to each of the divided cluster. Here, if the cluster consisting of one part-of-speech is created after the grouping, the typical part-of-speech ID may be given to the cluster.

In Step S606, the cluster dividing unit 210 evaluates the divided cluster. More specifically, it automatically converts the divided cluster to a kana or kanji string, compares the converted character string with a prestored correct character string, and calculates a character error rate obtained as a result. It performs this operation for the divided clusters in several ways of division, and determines the way of dividing that gives the smallest error rate.

Next, in Step S608, it is determined whether the divided cluster is more reliable than that before the division. If so, the process moves to Step S602, and performs further division of the cluster. On the other hand, if it is determined that the divided cluster is not reliable, the divided cluster is discarded and the cluster stored in the buffer is determined as the smallest group.

Figure 7:
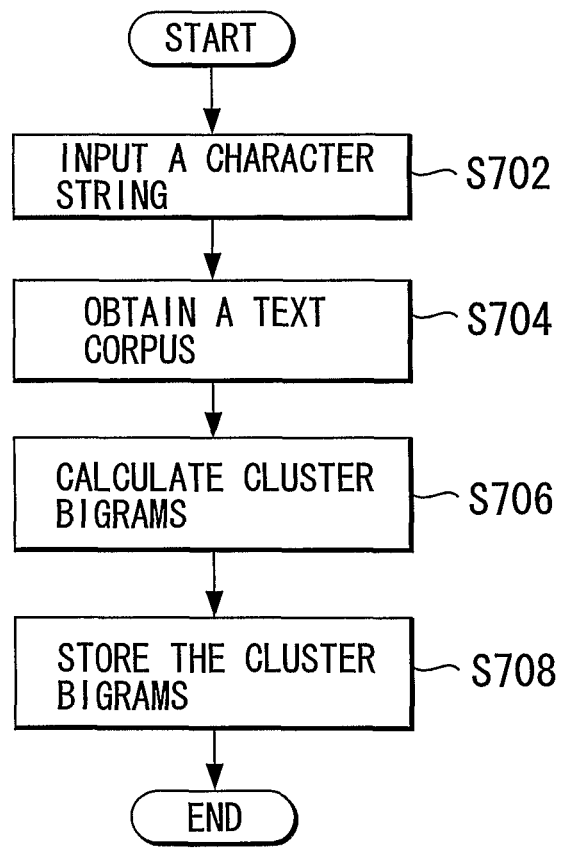
FIG. 7 illustrates a flow diagram showing a procedure for calculating the cluster bigram from the cluster created by the apparatus for creating the language model according to one embodiment of the present invention.

With reference to FIG. 7, the procedure for calculating the cluster bigram from the cluster created by the language model creating apparatus 200 is described.

In Step S702, the character string inputting unit 214 receives input of the character string.

In Step S704, the text corpus is created by giving the reading and the part-of-speech to each word included in the inputted character string. Note that the given part-of-speech is not the expanded part-of-speech.

Incidentally, in general acquisition of text corpus, the reading and part-of-speech are automatically added to words, and then, the text corpus obtaining unit 216 corrects wrongly added information under the operation of a user.

In Step S706, the calculation unit 222 combines two of the clusters stored in the storage unit 206. It then calculates the probability of occurrence of the resultant combined cluster in the text corpus (cluster bigram).

In Step S708, the combined cluster is stored in the storage unit 206 in association with the cluster bigram indicating the calculated probability. Here, the information on the cluster bigram may be a predetermined symbol instead of a numerical value.

The above described process can provide the optimum clusterization.

Figure 8:
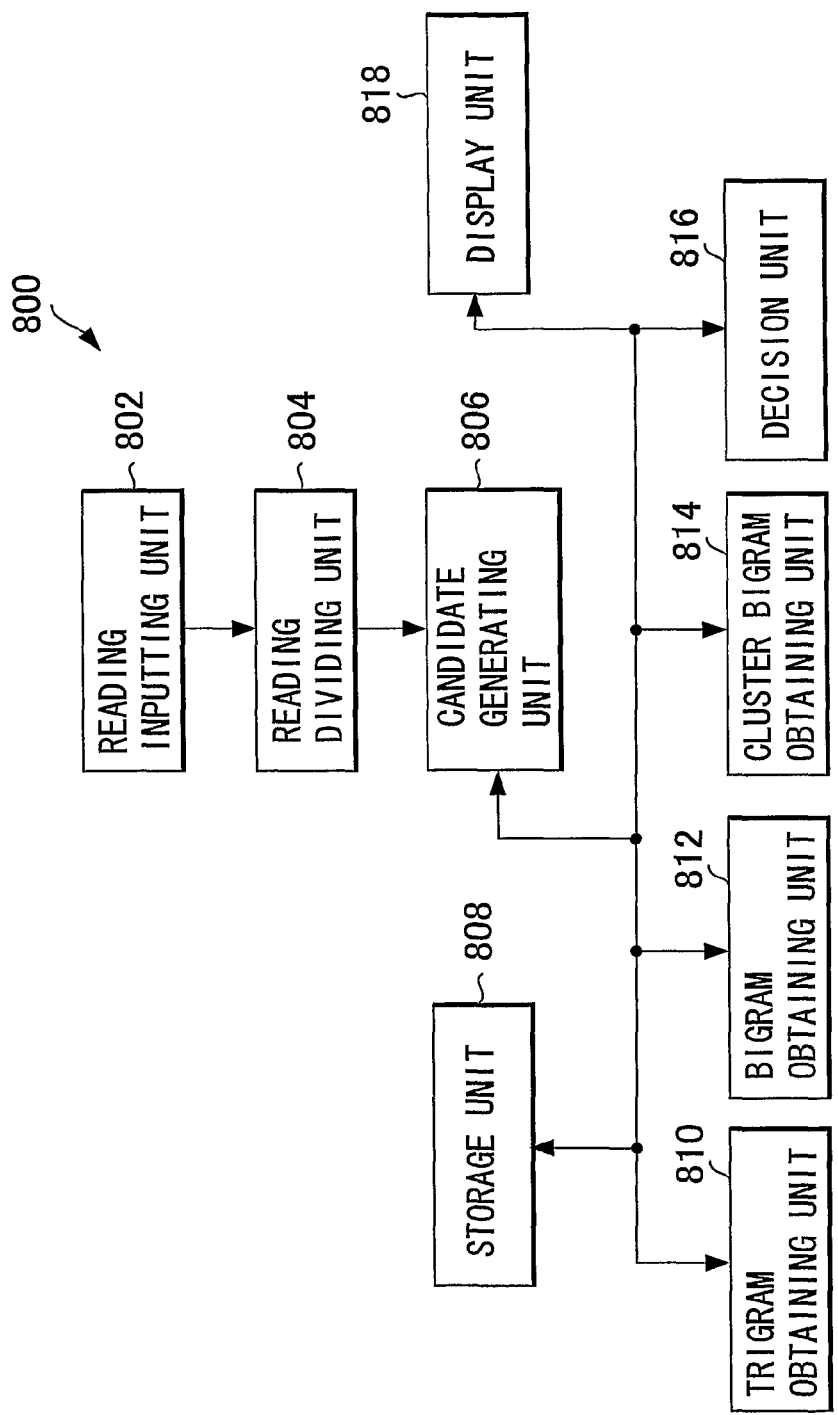
FIG. 8 illustrates a block diagram showing a functional configuration of a kana-kanji conversion apparatus using the cluster bigram according to one embodiment of the present invention.

FIG. 8 is a block diagram illustrates an example of the functional configuration of a kana-kanji conversion apparatus that performs kana-kanji conversion using the language model including the cluster bigram created as described above.

The kana-kanji conversion apparatus 800 includes a reading inputting unit 802, a reading dividing unit 804, a candidate generating unit 806, a storage unit 808, a trigram obtaining unit 810, a bigram obtaining unit 812, a cluster bigram obtaining unit 814, a decision unit 816 and a display unit 818.

The storage unit 808 stores the cluster bigram created by the above process, the trigram indicating the probability of the occurrence of the combination of three words, and the bigram indicating the probability of the occurrence of the combination of two words.

The reading inputting unit 802 is comprised of the mouse 461, tablet 464, keyboard 462, user input interface and the like and inputs the reading of the character string.

The reading dividing unit 804 divides the reading of the character string inputted by the reading inputting unit 802.

The candidate generating unit 806 converts the reading divided by the reading dividing unit 804 into kana or kanji to generate candidates for the converted character string.

The trigram obtaining unit 810 obtains a value that meets a predetermined condition from the trigram stored in the storage unit 808.

The bigram obtaining unit 812 obtains a value that meets a predetermined condition from the bigram stored in the storage unit 808.

The cluster bigram obtaining unit 814 obtains a value that meets a predetermined condition from the cluster bigram stored in the storage unit 808.

The decision unit 816 decides priority of candidates for the kana-kanji converted character strings in accordance with the trigram, the bigram, and the cluster bigram obtained from the storage unit 808.

Figure 9:
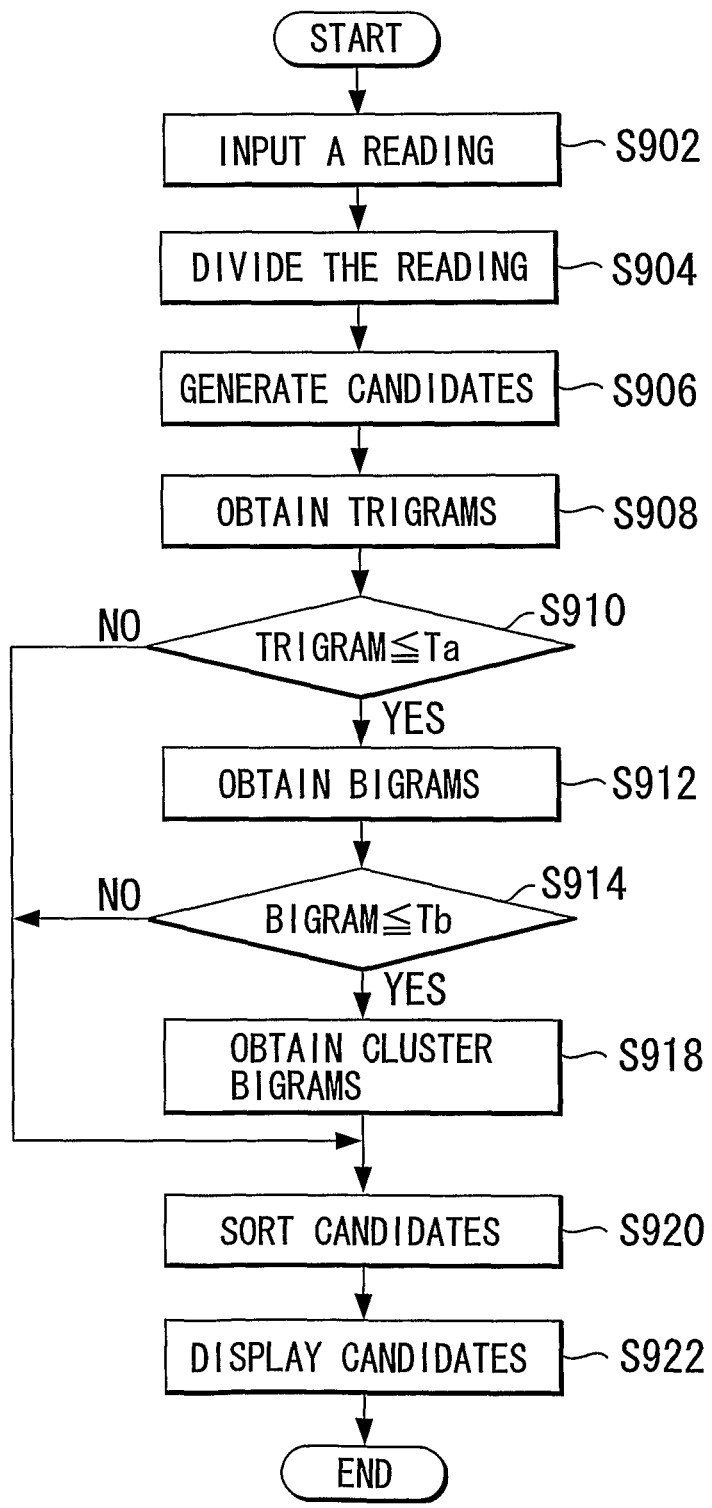
FIG. 9 illustrates a procedure of the kana-kanji conversion method performed by the kana-kanji conversion apparatus according to one embodiment of the present invention.

With reference to FIG. 9, the procedure of the method of kana-kanji conversion using Ngram (trigram and bigram) executed by the kana-kanji conversion apparatus 800 is described next.

In this embodiment, Back-off to the cluster bigram is performed when the trigram and bigram are both zero. In this case, p can be denoted as follows:

$$\begin{aligned} p(w3) &= p(w3 \mid w1w2) \\ &= p(w3 \mid w2) && \text{if } p(w3 \mid w1w2) \text{ is too small to rely on} \\ &= P(C_i \mid C_{i-1})P(w_i \mid C_i) && \text{if } p(w3 \mid w2) \text{ is too small to rely on} \\ &= \frac{\text{Count}(C_{i-1}C_i)}{\text{Count}(C_{i-1})} \frac{\text{Count}(w_i)}{\text{Count}(C_i)} \end{aligned}$$

Here, w1, w2 and w3 each denote words and $C_i$ denotes a cluster. In addition, P(Ci|Ci−1) denotes a probability of occurrence of the cluster Ci under the condition that $C_{i-1}$ precedes $C_i$. P($w_i$|$C_i$) is a probability that the word of $C_i$ is $w_i$.

The left term of the last formula shows that P($C_i$|$C_{i-1}$) is the number of the case that $C_i$ follows $C_{i-1}$ as divided by the number of occurrence of $C_{i-1}$. Similarly, from the right term of the last formula, P($w_i$|$C_i$) shows the number of occurrence of the word $w_i$ as divided by the number of occurrence of $C_i$ (i.e., occurrence of all of words belonging to the cluster $C_i$).

In Step S902, the reading inputting unit 802 inputs the reading of the character string in the form of a kana string, for example.

In Step S904, the reading dividing unit 804 divides the reading of the inputted character string.

In Step S906, the candidate generating unit 806 converts the divided reading into kana or kanji to generate candidates of the converted character string.

In Step S908, the trigram obtaining unit 810 obtains from the storage unit 808, trigram that indicates the probability of occurrence of the sequence of three words included in each candidate for the generated character string.

In Step S910, the trigram obtaining unit 810 determines whether the obtained probability is equal to or smaller than a predetermined value Ta. If it is smaller than Ta, the process goes to Step S912. The bigram obtaining unit 812 obtains from the storage unit 808, the bigram that indicates the probability of the occurrence of an order of two words included in the three words which are subject to the determination in Step S910.

In Step S914, whether the obtained bigram is equal to or smaller than a predetermined value Tb or not is determined. If the bigram is equal to or smaller than Tb, the process goes to Step S918. The cluster bigram obtaining unit 814 then obtains the cluster bigram that indicates the probability of the occurrence of order of clusters corresponding to the order of the two words from the storage unit 808.

In Step S920, the determination unit 816 determines priority of the candidates in accordance with the obtained trigram, bigram or cluster bigram, and sorts the candidates for the converted character string according to this order of precedence.

In Step S922, the determination unit 816 displays the converted character strings on a display 818 in the order sorted based on the order of precedence.

For example, assume that the reading "makikokaininnni" is inputted in Step S902.

In this case, the inputted reading can be divided as follows.

makiko-kaininn-ni

The candidates for the converted character string can include the following:

(巻き込 or 真貴子) - (解任 or 懐妊) - (に or 似)

The following table indicates examples of the trigram of combinations of the candidates for the converted character string.

| Candidate | Probability |
| --- | --- |
| 巻き込 - 解任 - に | 0 |
| 巻き込 - 解任 - 似 | 0 |
| 巻き込 - 懐妊 - に | 0 |
| 巻き込 - 懐妊 - 似 | 0 |
| 真貴子 - 解任 - に | 0.00001 |
| 真貴子 - 解任 - 似 | 0 |
| 真貴子 - 懐妊 - に | 0.00001 |
| 真貴子 - 懐妊 - 似 | 0 |

The following table indicates examples of combinations of the candidates for the converted character string.

| Candidate | Probability |
| --- | --- |
| 巻き込 - 解任 | 0 |
| 巻き込 - 懐妊 | 0 |
| 真貴子 - 解任 | 0.00001 |
| 真貴子 - 懐妊 | 0.00001 |
| 解任 - に | 0.00001 |
| 解任 - 似 | 0 |
| 懐妊 - に | 0.00001 |
| 懐妊 - 似 | 0 |

If the kana-kanji conversion apparatus 800 determined that none of the trigram nor bigram cannot be trusted, it uses the back-off to the cluster bigram as a last resort. Assume that the following cluster bigram is provided.

| Type of Cluster | Probability |
| --- | --- |
| [stem of a verb having five-step conjugation in the M series (巻き込)] - [noun followed by verb having irregular conjugation in the S series(解任, 懐妊)] | 0 |
| [noun (真貴子)] - [noun followed by verb having irregular conjugation in the S series (解任, 懐妊)] | 0.1 |
| probability of occupancy off 解任 in nouns followed by verb having irregular conjugation in the S series | 0.001 |
| probability of occupancy of 懐妊 in nouns followed by verb having irregular conjugation in the S series | 0.0001 |

With reference to the above tables, the probability for "真貴子解任" is {the probability of [noun (真貴子)]–[noun followed by verb having irregular conjugation in the S series (解任, 懐妊)]}*[the probability of occupancy of 解任 in nouns followed by verb having irregular conjugation in the S series]=0.1*0.001=0.0001 and is the biggest probability in the above order of two words. As such, use of the back-off to the cluster bigram can restrain errors in conversion such as "巻き込解任" in which the noun followed by verb having irregular conjugation in the S series follows the stem of the verb.

According to the above described process, the cluster can be constructed based on superficial attributes that can be distinguished by machines.

Also, the kana-kanji conversion can be performed taking context into account because substituting the cluster bigram for the back-off to the unigram means that the cluster bigram is the last resort.

Orders of implementations or executions of the methods illustrated and explained herein are not fundamental unless it is designated specifically. That is, the inventor contemplates that elements of these methods can be performed in any order, and these methods may include more or less elements other than those disclosed herein unless it is designated specifically.

It should be understood that some of objects of the present invention and other advantageous results are accomplished in consideration of the above discussion.

In the above configurations and methods, various modifications can be made without deviating from a scope of the embodiment of the present invention.

For example, the functional blocks as shown in FIG. 2 can be decomposed into groups of flow diagrams shown in FIGS. 4, 6 and 7. Therefore, they can be configured as an apparatus for performing the method as shown in FIG. 4, another apparatus for performing the method as shown in FIG. 6, and the other apparatus for performing the method as shown in FIG. 7. Also, it is possible to configure an apparatus for performing any combinations of the methods as shown in FIGS. 4, 6 and 7.

In addition, it is possible to configure an apparatus including the function as shown in FIG. 2 and that as shown in FIG. 8.

Further, although the above embodiment refers to FIG. 9 and describes the example for obtaining the trigram, the bigram and the cluster bigram by turns using thresholds, it is possible to use the highest probability for the determination after calculation of all of the trigram, bigram and cluster bigram without using the thresholds.

Furthermore, although the above embodiment has described the example that performs kana-kanji conversion using the trigram, the bigram and the cluster bigram, the same effect can be obtained by adopting the back-off to the cluster bigram in any Ngram kana-kanji conversion (N is not smaller than 2).

Therefore, it is contemplated that all contents shown in the attached drawings should be interpreted as illustration rather than limitation.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. A computer-readable storage medium having computer-executable instructions stored thereon for creating a language model and performing Kana-Kanji conversion, wherein the computer-executable instructions cause a computer that executes the instructions to:
   receive a Kana character string;
   divide the Kana character string into substrings and generate Kanji candidates for each substring;
   obtain a plurality of trigram probabilities of Kanji candidates;
   determine whether any of the plurality of trigram probabilities is above a first threshold and select a Kanji candidate if a trigram probability is above the first threshold;
   when it is determined none of the plurality of trigram probabilities is above the first threshold:
      obtain a plurality of bigram probabilities of Kanji candidates; and
      determine whether any of the plurality of bigram probabilities is above a second threshold and select a Kanji candidate if a bigram probability is above the second threshold;
   when it is determined none of the plurality of bigram probabilities is above the second threshold:
      select a Kanji candidate based on cluster bigram probabilities of the Kanji candidates, wherein at least one cluster in the cluster bigram probabilities includes combining the same Kanji-Kana pairs with different parts-of-speech; and
   display the selected Kanji candidates based on an order of precedence.

2. The computer-readable storage medium of claim 1 wherein the computer-executable instructions further cause the computer that executes the instructions to store a dictionary of words in the Japanese language.

3. The computer-readable storage medium of claim 2 wherein the computer-executable instructions further cause the computer that executes the instructions to:
   identify subsets of words having the same display and reading but are associated with different parts-of-speech in the dictionary; and
   create a cluster for each identified subset of words indicating the different parts-of-speech associated with each identified subset of words.

4. The computer-readable storage medium of claim 3 wherein the computer-executable instructions further cause the computer that executes the instructions to:
   calculate the plurality of trigram probabilities from the number of occurrences of each word trigram in a training corpus; and
   calculate the plurality of bigram probabilities from the number of occurrences of each word bigram in the training corpus.

5. The computer-readable storage medium of claim 3 wherein the computer-executable instructions further cause the computer that executes the instructions to calculate the plurality of cluster bigram probabilities based on the number of occurrences in a training corpus of a word associated with a second cluster and the number of occurrences in the training corpus of a selected part of speech preceding the word associated with the second cluster.

6. The computer-readable storage medium of claim 2 wherein the computer-executable instructions further cause the computer that executes the instructions to:
   divide the cluster to produce at least one divided cluster containing one or more parts-of-speech from the cluster, when the cluster includes a plurality of parts-of-speech;
   convert the cluster and each divided cluster into strings of Kanji characters or Kana characters;
   determine if the divided cluster is more reliable than the cluster based on a comparison of the corresponding character strings against a reference character string; and
   store the more reliable of the cluster and the divided cluster in the language model.

7. The computer-readable storage medium of claim 6 wherein the computer-executable instructions further cause the computer that executes the instructions to:
   calculate a character error rate for the cluster and each divided cluster based on a comparison of the character strings against the reference character string representing a known proper character string; and
   determine that the divided cluster is more reliable than the cluster if the character error rate for the divided cluster is less than the character error rate for the cluster.

8. The computer-readable storage medium of claim 7 wherein the computer-executable instructions further cause the computer that executes the instructions to discard the divided cluster when the divided cluster has a character error rate greater than or equal to the character error rate for the cluster.

9. A system for converting Kana to Kanji, the system comprising:
   a reading inputting unit that receives a reading associated with Kana character string;
   a reading dividing unit that divides the Kana character string into substrings;
   a candidate generating unit that generates Kanji candidates for each substring;
   a trigram obtaining unit that obtains trigram probabilities representing the probabilities of occurrence of Kanji candidate trigrams, each Kanji candidate trigram being a combination of the Kanji candidates generated for three substrings;
   a bigram obtaining unit that obtains bigram probabilities representing the probabilities of occurrence of Kanji candidate bigrams, each Kanji candidate bigram being a combination of the Kanji candidates generated for two substrings;
   a cluster bigram obtaining unit that obtains cluster bigram probabilities representing the probabilities of occurrence of combinations of parts-of-speech of the Kanji candidate bigrams where the Kanji candidate for at least one of the substrings is associated with different parts-of-speech;
   a decision unit selecting the Kanji candidates based on the Kanji candidate trigram with the highest trigram probability that exceeds a trigram probability threshold, selecting the Kanji candidates based on the Kanji candidate bigram with the highest bigram probability that exceeds a bigram probability threshold if none of the trigram probabilities exceeds the trigram probability threshold, and selecting the Kanji candidates based on the cluster bigram with the highest cluster bigram probability if none of the bigram probabilities exceeds the bigram probability threshold; and a presentation unit that presents the selected Kanji candidates based on an order of precedence.

10. The system of claim 9 further comprising:
a dictionary storage unit that stores a plurality of words, each word having an associated display, reading, and part-of-speech;
a word obtaining unit that identifies the part-of-speech of the words having the same display and reading from the dictionary storage unit;
a cluster creating unit that creates a cluster for the words having the same display and reading by combining parts-of-speech of the words having the same display and reading; and
a cluster storing control unit storing the cluster in a storage unit.

11. The system of claim 10 further comprising:
a cluster dividing unit that divides the clusters stored in the storage unit according to the parts-of-speech;
a combining unit that combines two clusters stored in the storage unit to create a cluster bigram;
the calculation unit that calculates a probability of occurrence of the cluster bigram;
a cluster bigram storing control unit that associates the cluster bigram with the cluster bigram indicating the probability calculated by a calculation unit.

12. A method for converting a string of Kana characters into a string of Kanji characters in a Japanese writing system, the method comprising the acts of:
receiving the string of Kana characters comprising a number of substrings;
generating Kanji candidates for each of the substrings;
selecting the Kanji candidates if a trigram probability generated for a trigram of Kanji candidates is above a first threshold;
when no trigram probability is above the first threshold, selecting the Kanji candidates if a bigram probability generated for a bigram of Kanji candidates is above a second threshold;
when no bigram probability is above the second threshold, selecting the Kanji candidates based on cluster bigram probabilities calculated for combinations of clusters associated with different display and reading pairs, at least one cluster generated from different parts-of-speech associated with a single display and reading pair; and
displaying the Kanji candidates associated with the corresponding substrings based on an order of precedence.

13. The method of claim 12 further comprising the act of dividing the string of Kana characters into substrings.

14. The method of claim 12 further comprising the act of storing a Japanese language dictionary comprising a plurality of entries, each entry comprising a display, a reading, and a part-of-speech.

15. The method of claim 14 further comprising the act of:
forming clusters from the entries in the Japanese language dictionary having the same displays and readings together with the associated parts-of-speech for those entries; and
storing the clusters.

16. The method of claim 15 further comprising the act of assigning a unique identifier to the cluster.

17. The method of claim 15 wherein the act of forming clusters from the entries in the Japanese language dictionary having the same displays and readings together with the associated parts-of-speech for those entries further comprises the act of:
forming a cluster for each unique pair of displays and readings from the entries in the Japanese language dictionary;
joining parts-of-speech associated with each entry matching the unique pair of displays and readings to form an expanded part-of-speech for the unique pair of displays and readings; and
adding the expanded part-of-speech to the cluster for the unique pair of displays and readings.

18. The method of claim 15 further comprising the act of building a language model based on character error rates calculated each cluster using assumptive division.

19. The method of claim 18 wherein the act of building the language model based on the character error rates calculated for each cluster using assumptive division further comprises the acts of:
dividing the cluster to produce at least one divided cluster containing one or more parts-of-speech from the cluster, when the cluster includes a plurality of parts-of-speech;
converting the cluster and each divided cluster into character strings of Kanji characters, Kana characters, or both;
calculating the character error rate for the cluster and each divided cluster based on a comparison of the character strings against a reference character string from a training corpus, the reference character string being a known proper character string;
discarding each divided cluster having a character error rate greater than or equal to the character error rate for the cluster;
storing each divided cluster having a character error rate lower than the character error rate for the cluster in the language model; and
storing the cluster in the language model when no divided cluster has a character error rate lower than the character error rate for the cluster.

20. The method of claim 19 wherein the act of dividing the cluster to produce the at least one divided cluster containing the one or more parts-of-speech from the cluster, when the cluster includes the plurality of parts-of-speech further comprises dividing the cluster according to a set of instructions for dividing the cluster into at least two clusters having non-overlapping sets of the parts-of-speech associated with the cluster.

* * * * *